United States Patent [19]

Halpine

[11] 4,067,352
[45] Jan. 10, 1978

[54] VALVE HAVING INTEGRITY ASSURANCE MEANS

[76] Inventor: Joseph Charles Halpine, 1908 W. Latimer Place, Tulsa, Okla. 74127

[21] Appl. No.: 642,750

[22] Filed: Dec. 22, 1975

[51] Int. Cl.² .............................................. F16K 1/226
[52] U.S. Cl. ...................................... 137/312; 251/306
[58] Field of Search ............................... 251/305–308; 137/312, 375

[56] References Cited

U.S. PATENT DOCUMENTS

| 2,058,996 | 10/1936 | Kollberg | 251/306 |
| 2,883,149 | 4/1959 | Fiorentini | 251/306 |
| 3,026,083 | 3/1962 | McLaren et al. | 251/306 X |
| 3,030,066 | 4/1962 | Swain | 251/306 X |
| 3,043,557 | 7/1962 | Stillwagon | 251/306 |
| 3,473,554 | 10/1969 | King | 137/312 |
| 3,650,508 | 3/1972 | Kosmala et al. | 251/307 X |

FOREIGN PATENT DOCUMENTS

| 901,607 | 7/1962 | United Kingdom | 137/312 |

Primary Examiner—Martin P. Schwadron
Assistant Examiner—Richard Gerard
Attorney, Agent, or Firm—Head, Johnson & Chafin

[57] ABSTRACT

A valve having integrity assurance means including a valve body with a flow passageway through it, the flow passageway having a circumferential valve seat and the valve body having a small diameter test opening communicating the seat with the exterior of the valve, and having a valve disc with a circumferential sealing surface supported in the body, the disc being rotatable to an open position permitting fluid flow through the valve to either side of the disc and to another position to close the valve by the contact of the disc sealing surface with the valve seat, the disc sealing surface and the valve seat having cooperative configuration to provide two spaced apart circumferential contact areas between the seat and the disc, the test opening communicating between these contact areas so that when the valve is in the fully closed position the test opening can be utilized as a means to test the integrity of the valve, that is, to insure that no leakage is occurring past the valve disc. In one embodiment the disc has two raised, circumferential, spaced-apart, sealing surfaces which engage an elastomeric seat in the valve body. In another embodiment the valve disc has two spaced apart circumferential grooves with resilient seals therein which engage the valve sealing surface to either side of the test opening when the valve is in the closed position.

4 Claims, 6 Drawing Figures

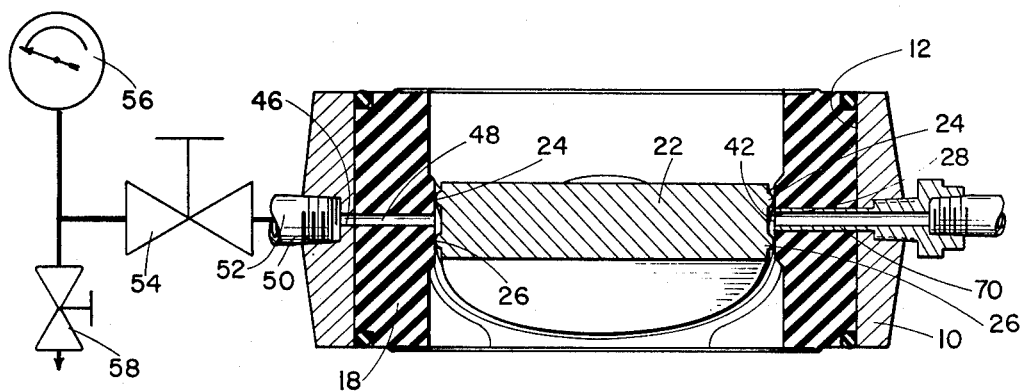
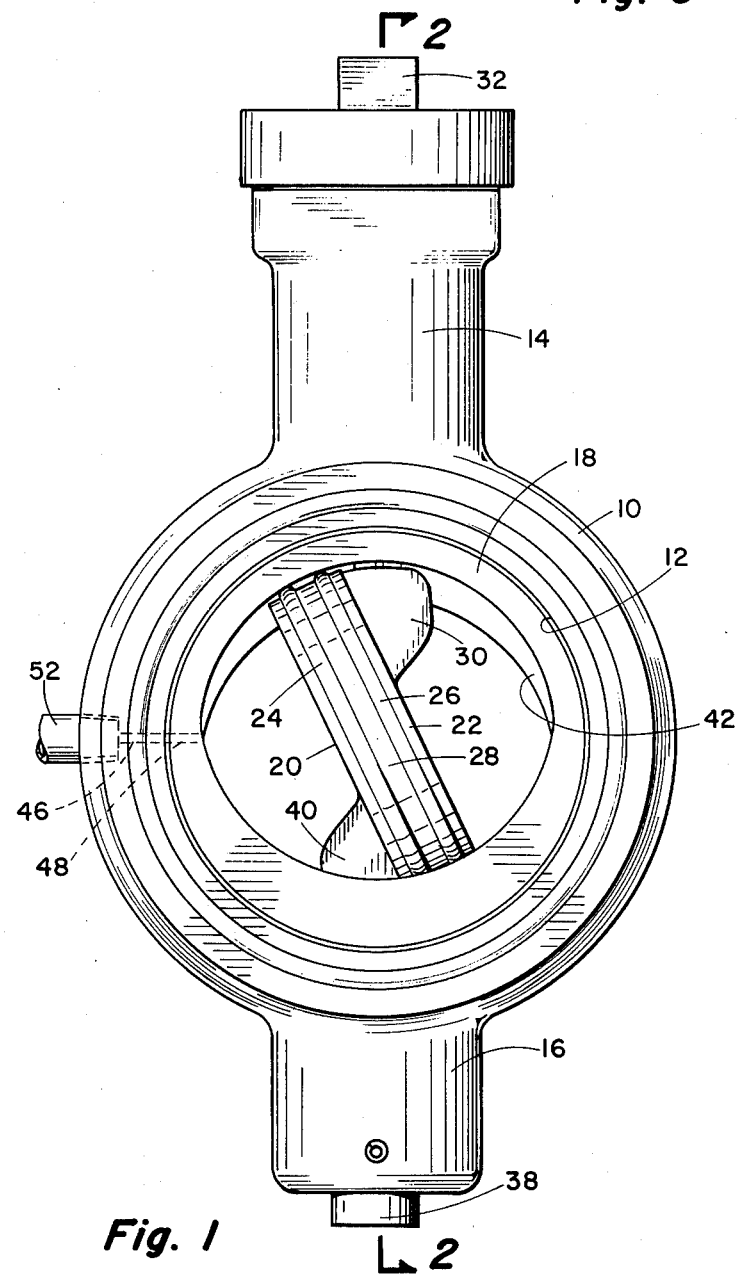
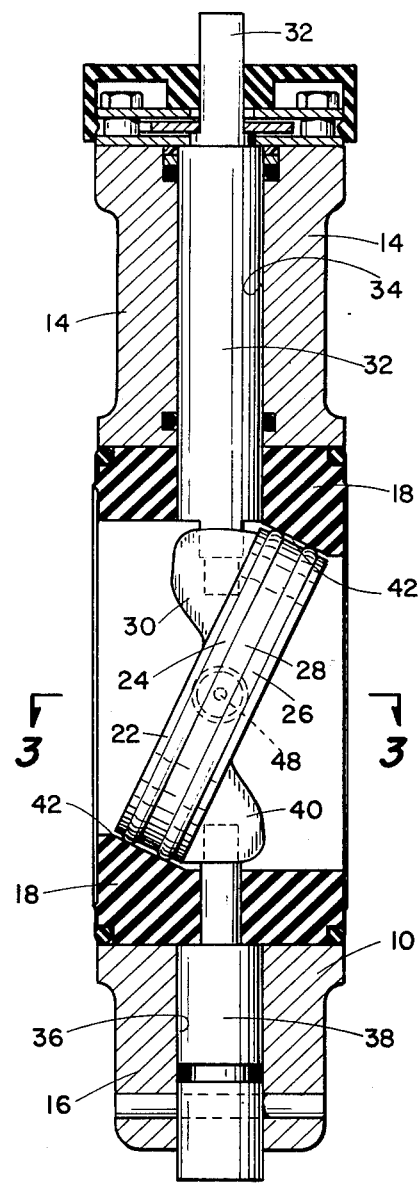
Fig. 3
Fig. 1
Fig. 2

VALVE HAVING INTEGRITY ASSURANCE MEANS

BACKGROUND AND OBJECTS OF THE INVENTION

Butterfly type valves have long been known and are commonly used in industry. With a butterfly or any other type valve it is frequently desirable to expeditiously determine the integrity of the valve when it is in the closed position, that is, to determine as a certainty whether or not the valve is permitting leakage of fluid or gases past it.

In many industrial applications integrity of valve closure is assured by placing two valves in series. The valve closure members may be coupled together for simultaneous action. When the coupled valves are closed a line between the valves can then be tapped and by measuring pressure or otherwise it can be determined as a certainty that no fluid flow is taking place past the valves.

The use of series valves is an expensive procedure. Not only does it double the valve cost to provide this leakproof assurance, but the coupling of the valve for simultaneous action is an additional expense.

The present disclosure is directed towards a valve of the butterfly type having all the inherent advantages of a butterfly valve, including simplicity, economy, dependability and so forth, while at the same time providing an inexpensive means of assuring the integrity of the valve.

It is therefore an object of this invention to provide a valve of the butterfly type having economical and inexpensive means of readily indicating leakproof closure of the valve.

Another object of this invention is to provide a valve of the butterfly valve type including a valve disc having plural sealing means in combination with provisions in the valve body for venting the space between the disc seals to provide an indication of the leakproof closure of the valve.

These objects as well as other and more specific objects of the invention will be fulfilled in the following description and claims, taken in conjunction with the attached drawings.

DESCRIPTION OF VIEWS

FIG. 1 is an end view of a butterfly valve embodying this invention, the valve being shown in the fully opened position.

FIG. 2 is a cross-sectional view taken along the line 2—2 of FIG. 1 but showing the valve in the closed position.

FIG. 3 is a cross-sectional view taken along the line 3—3 of FIG. 2.

SUMMARY OF THE INVENTION

Figure 6:
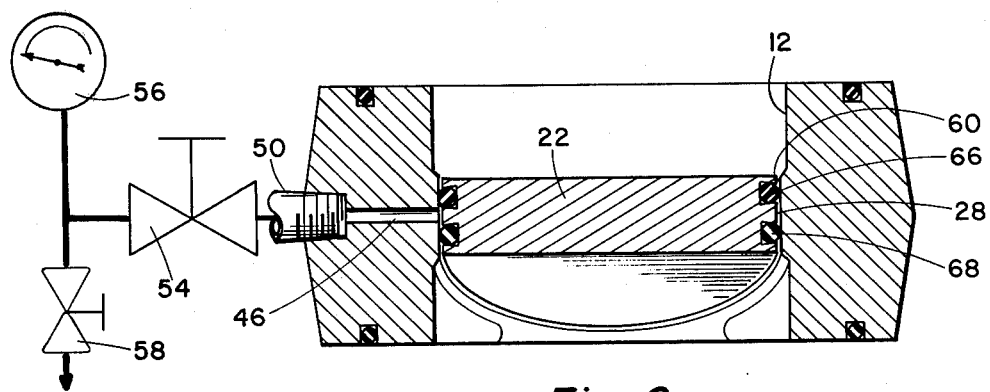
FIG. 6 is a cross-sectional view taken along the line 6—6 of FIG. 5.

A valve having integrity assurance means including a valve body having a flow passageway therethrough, a disc mounted in the flow passageway, means extending through and externally of the body to controllably position the disc so that in one position it is open to permit flow of fluid through the valve to either side of the disc and in the other position it contacts the valve body around the full circumferential periphery to close against fluid flow, the disc having spaced apart parallel circumferential sealing means around the periphery thereof engaging the valve body to provide two separate spaced apart sealing engagements with the valve body, and the body having a small diameter test opening extending externally of the valve and communicating with the area between the sealing contacts when the disc is in the fully closed position providing means to indicate that the valve is not leaking.

DETAILED DESCRIPTION

Referring to the drawings and first to FIGS. 1, 2 and 3, a butterfly valve embodying the principles of this invention is illustrated. The valve includes a body 10 usually made of metal, the body having a flow passageway 12 therethrough. Integrally formed with the body is a top stem housing 14 and a lower stem housing 16.

Positioned in the valve flow passageway 12 is an elastomeric seat member 18. Rotatably positioned within the seat member 18 is a valve disc 20 having a circumferential sealing surface 22. Positioned on the sealing surface 22 is a first increased diameter circumferential sealing ridge 24 and a second, spaced apart, paralleled, increased diameter circumferential sealing ridge 26. The spaced apart sealing ridges 24 and 26 provide a circumferential valley 28 therebetween.

The disc 22 has an upper boss 30 which is engaged by the lower end of a valve stem 32 rotatably and sealably positioned in a valve stem opening 34 contained in the top stem housing 14. The upper end 32A of the valve stem extends externally of the valve to provide means of rotatably positioning disc 20.

Positioned in the lower stem boss 16 is a lower stem opening 36 having a lower stem 38 therein, the upper end of which rotatably engages a disc lower boss 40.

The elastomeric seal member 18 has an internal circumferential sealing surface 42. Formed in the valve body 10 is a small diameter test opening 46 and, in like manner, formed in the elastomeric seat member 18 is a test opening 48, the openings 46 and 48 being in communication with each other. As shown in FIG. 3, the opening 46 may communicate with a larger diameter threaded opening 50 receiving a pipe 52. The small diameter test opening 48 in the elastomeric seat 18 communicates with the sealing surface 42 between the disc sealing ridges 24 and 36 when the disc is in the fully closed position. It can be seen that when the disc is in an opened position, such as shown in FIG. 1, the test opening 48 is exposed to fluid pressure within the valve. To close the test opening a small valve 54 (FIG. 3) may be placed in pipe 52. To indicate the efficacy of the valve when in the closed position, gauge 56 may be placed in series with pipe 52.

When the valve is in the fully closed position, as shown in FIGS. 2 and 3, fluid flow through the valve is blocked by the sealing contact of the first disc sealing ridge 24 as well as by the second disc sealing ridge 26. That is, two separate sealing engagements are provided between the disc 22 and the valve seat 18. The valley area 28 between the sealing ridges 24 and 26 is not subjected to fluid flow if the sealing contact provided by ridge 24 and ridge 26 are functioning to provide complete closure of the valve. When the valve is subjected to fluid pressure and when in a closed position, the integrity of the valve can be checked by opening the small valve 54. Valve 58 may then be opened exposing the valley area 28 between the sealing ridges 24 and 26 to atmosphere. Small valve 58 may then be closed. If leakage occurs in the valve permitting fluid to flow past one or the other of the sealing ridges 24 and 26 into the valley area 28, pressure will build in the valley area. This pressure is transmitted through test openings 46 and 48, pipe 52, and valve 54 to gauge 56. By observing gauge 56 an operator can then determine whether or not the valve is leaking.

Various other means may be provided for checking leakage. A single small valve 54 may be attached to pipe 52, the valve being open to atmosphere. With the valve 54 open any leakage which occurs will cause fluid flow out through the passageways 46 and 48, pipe 52 and through valve 54, to indicate the leakage.

Another means of testing the efficacy of the valve in the closed position is to apply pressure to the test openings to raise the pressure in the valley annular area 28 to a level above the pressure to either side of the disc 20 and observe whether or not the pressure decreases, that is, whether pressure leaks off past one or the other of sealing ridges 24 and 26. It can be seen that many other different means may be provided for utilizing the features of this invention to indicate the existence or nonexistence of leakage past the valve disc.

Figure 4:
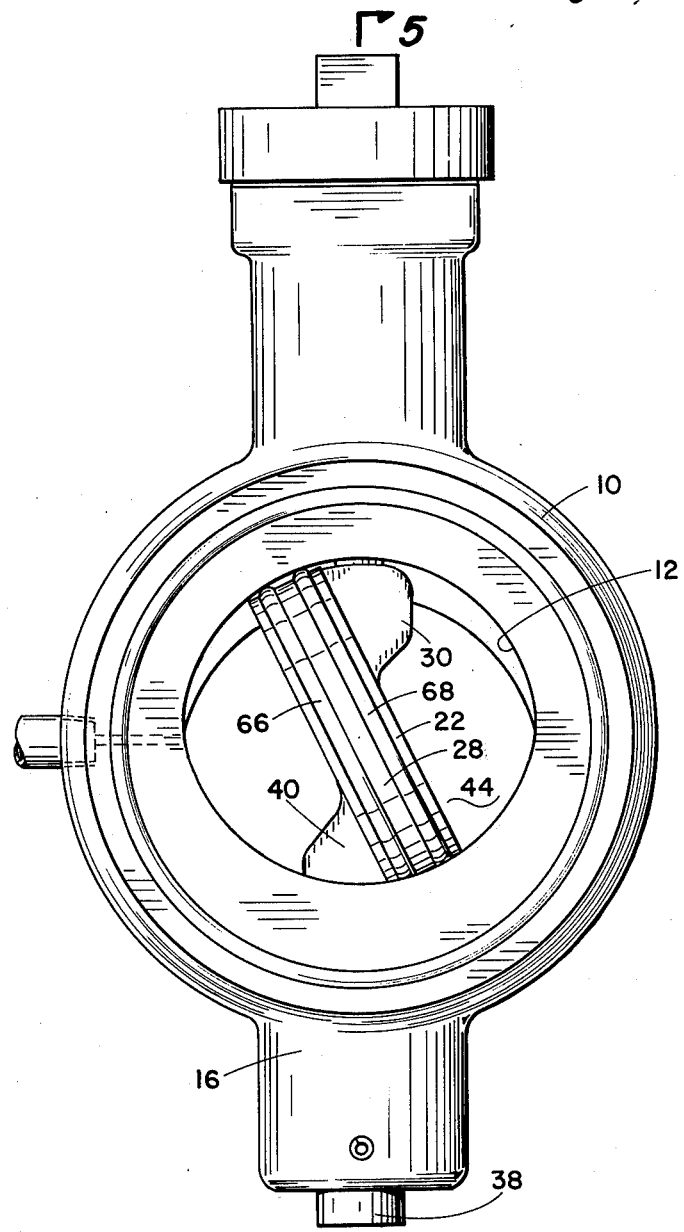
FIG. 4 is a view as shown in FIG. 1 but showing an alternate embodiment of the invention.
Figure 5:
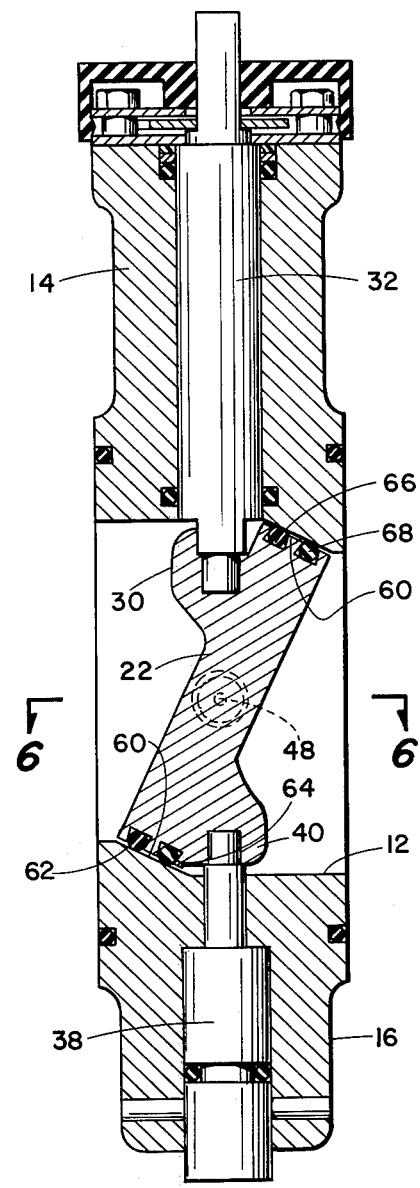
FIG. 5 is a cross-sectional view taken along the line 5—5 of FIG. 4 but showing the valve in the closed position.

FIGS. 4, 5 and 6 show an alternate embodiment of the invention. In these figures the valve illustrated is essentially the same with two basic differences: First, the valve body is not provided with a separate elastomeric seal but the body itself is provided with a sealing surface 60; and second, valve disc 22 has spaced apart circumferential grooves 62 and 64. Positioned in groove 62 is a seal 66 which is illustrated, as an example, in the form of an O-ring, and in like manner in groove 64 is a continuous seal 68. The seals project beyond the normal circumferential diameter of disc 22 to sealably engage the body sealing surface 60 when the disc is in closed position. Seals 66 and 68 provide the valley 28 therebetween which is communicated with by the test opening 46 in the valve body as shown in FIG. 6.

The embodiment of FIGS. 4, 5 and 6 as compared to that of FIGS. 1, 2 and 3 illustrates that the invention may be employed in different valve designs. While both arrangements illustrated herein show a butterfly valve of the slanted disc type, that is, with the plane of the disc askew of the longitudinal axis of stem 32 and stem 38, it can be seen that the principles of the invention would function the same in different butterfly valve designs. Particularly, many butterfly valves utilize an arrangement wherein the disc is in a plane parallel the longitudinal axis of the valve stem and the invention would work in exactly the same way as illustrated herein. Virtually any arrangement which provides a disc having an uninterrupted cicumferential sealing surface may be employed in practicing the invention.

To insure that fluid will not penetrate between the external circumference of seat 18 and body passageway 12, a tube 70 may be employed as illustrated in the right hand portion of FIG. 3. Tube 70 may be threaded into the valve body 10 as illustrated. It sealably contacts the elastomeric seat member 18 so that no fluid flow can occur around the external circumference of the tube. Obviously, only one or the other of the arrangements illustrated in the left or right hand side of FIG. 3 would be used, not both at the same time. Other similar refinements may be made in a valve which encompasses the invention.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A valve having integrity assurance means, comprising:
   a valve body having an axial flow passageway therethrough and having a stem opening intersecting the flow passageway perpendicular the axis thereof, the body having a valve seat therein surrounding said flow passageway and having a stem opening coaxial with said body stem opening and having a small diameter test opening communicating between said valve seat and the exterior of the valve body;
   a planar valve disc having a circumferential sealing surface, the disc being supported in said body fluid passageway in a plane oblique to the axis of said stem openings in the body and valve seat, the disc being rotatable between an open position permitting fluid flow through the valve to either side of the disc, and a closed position wherein the valve circumferential sealing surface sealably contacts said valve seat around the full periphery thereof to block flow through said passageway, said valve seat and said disc sealing surface being cooperatively configured to provide two spaced apart circumferential uninterrupted sealing contacts, the sealing contacts being to either side of said test opening and displaced from said stem opening; and
   a stem rotatably supported in said valve stem opening, the inner end of the stem engaging said disc oblique to the plane thereof and spaced away from said disc sealing surface and the outer end extending exteriorly of said valve providing means of rotatably positioning said disc.

2. A valve according to claim 1 wherein said valve disc sealing surface has two spaced apart grooves therein; and
   a continuous resilient seal positioned in each of said grooves, the seals resiliently engaging said valve seat one to either side of said test opening when the valve disc is in the closed position.

3. A valve according to claim 1 including:
   a circumferential elastomeric seat member sealably received in said valve body fluid passageway and having a test opening therein communicating with said body test opening; and
   said disc circumferential sealing surface having two spaced apart circumferential sealing ridges of increased diameter, the sealing ridges providing a circumferential valley therebetween, the sealing ridges sealably engaging said elastomeric valve seat when the disc is in the closed position, the sealing ridges being to either side of said test opening.

4. A valve according to claim 3 including:
   a tubular member received in said test opening in said elastomeric seat member, the tubular member being in communication with said test opening in said valve body.

* * * * *